US012294841B2

(12) United States Patent
Sun et al.

(10) Patent No.: US 12,294,841 B2
(45) Date of Patent: May 6, 2025

(54) AUDIO PLAYING METHOD, ON-BOARD AUDIO SYSTEM, AND STORAGE MEDIUM

(71) Applicant: AAC Technologies (Nanjing) Co., Ltd., Nanjing (CN)

(72) Inventors: Shuyuan Sun, Shenzhen (CN); Yiming Meng, Shenzhen (CN); Xin Zhang, Shenzhen (CN); Hao Yin, Shenzhen (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 235 days.

(21) Appl. No.: 18/091,420

(22) Filed: Dec. 30, 2022

(65) Prior Publication Data

US 2024/0098414 A1 Mar. 21, 2024

Related U.S. Application Data

(63) Continuation of application No. PCT/CN2022/120940, filed on Sep. 23, 2022.

(30) Foreign Application Priority Data

Sep. 8, 2022 (CN) ......................... 202211097006.6

(51) Int. Cl.

| | |
|---|---|
| ***H04B 1/00*** | (2006.01) |
| ***H04R 3/12*** | (2006.01) |
| ***H04R 5/04*** | (2006.01) |
| *H04R 5/02* | (2006.01) |

(52) U.S. Cl.
CPC ................. *H04R 3/12* (2013.01); *H04R 5/04* (2013.01); *H04R 2499/13* (2013.01)

(58) Field of Classification Search
CPC ......... H04R 3/12; H04R 5/04; H04R 2499/13
USPC .................................................... 381/86, 302
See application file for complete search history.

(56) References Cited

U.S. PATENT DOCUMENTS 10,560,795 B1 * 2/2020 Kim ........................ H04S 7/303
2012/0294457 A1 * 11/2012 Chapman ................. H04R 3/00
381/98

* cited by examiner

*Primary Examiner* — Ammar T Hamid
(74) *Attorney, Agent, or Firm* — Wiersch Law Group

(57) ABSTRACT

The audio playing method is provided by embodiments of the present disclosure, applied to on-board audio system (including multiple speaker modules arranged at different positions in a car cabin, the audio playing method includes: obtaining an audio signal to be played; decomposing the audio signal to obtain multiple audio source signals of different categories, where each of the multiple sound source signals includes multiple sub sound source signals of a same category; establishing a route between all sub sound source signals and the multiple speaker modules according to a preset distribution principle indicating rules for playing different sub sound source signals by different speaker modules; and playing each of the multiple sub sound source signals by a corresponding speaker module according to the route. The present disclosure provides more accurate and immersive car multi-channel surround sound playback, which can effectively improve overall acoustic experience of the on-board audio system.

18 Claims, 3 Drawing Sheets

AUDIO PLAYING METHOD, ON-BOARD AUDIO SYSTEM, AND STORAGE MEDIUM

CROSS REFERENCE TO RELATED APPLICATIONS

The present disclosure is a continuation of PCT Patent Application No. PCT/CN2022/120235, entitled "AUDIO PLAYING METHOD, ON-BOARD AUDIO SYSTEM AND STORAGE MEDIUM," filed Sep. 21, 2022, which claims priority to Chinese patent application No. 202211097006.6, entitled "AUDIO PLAYING METHOD, ON-BOARD AUDIO SYSTEM AND STORAGE MEDIUM," filed Sep. 8, 2022, each of which is incorporated by reference herein in its entirety.

TECHNICAL FIELD

The present disclosure relates to the technical field of audio signal processing and application, in particular to an audio playing method, an on-board audio system and a storage medium.

BACKGROUND

As an important part of the car entertainment facilities, an on-board audio system brings users an excellent and immersive driving experience by playing audio in the car cabin. From the development history of the number of speakers in the on-board audio system, in the era of fuel vehicles, the on-board audio system includes at least four speakers, while in the era of intelligent cockpit, the on-board audio system is generally equipped with more than 20 speakers. It is not difficult to see that the user's pursuit of sound has evolved from the original simple sound quality improvement to the current desire for sound effects in the sound field. Under the multi speaker architecture of the on-board audio system, a better and more immersive surround sound experience becomes particularly important.

In the conventional art, most of the on-board hosts and user terminals can only provide dual channel audio sources, so that in the processing of surround sound can only be realized by simply mixing the dual channel audio sources with a speaker route. Of course, a small number of high-end or flagship vehicles may also increase the surround feeling through some sound effects processing of binaural crosstalk elimination. However, whether it is to simply mix the dual channel sound source with the speaker route or to increase the surround feeling through the sound effect processing of binaural crosstalk elimination, it is impossible to create an excellent surround sound experience, and may even have a negative impact on the sound quality, resulting in poor overall acoustic experience of the on-board audio system.

Therefore, it is necessary to improve the audio playing mode of the above on-board audio system.

SUMMARY

An object of the present disclosure is to provide an audio playing method, an on-board audio system and a storage medium, to solve the problem of poor overall acoustic experience effect of the on-board audio system in the conventional art.

In order to solve the above technical problem, a first aspect of the embodiments of the present disclosure provides an audio playing method, which is applied to an on-board audio system. The on-board audio system includes multiple speaker modules arranged at different positions in a car cabin;

the audio playing method includes:

obtaining an audio signal to be played;

decomposing the audio signal to obtain multiple audio source signals of different categories, where each of the multiple sound source signals includes multiple sub sound source signals of a same category;

establishing a route between all the multiple sub sound source signals and the multiple speaker modules according to a preset distribution principle, where the preset distribution principle indicates rules for playing different sub sound source signals in the multiple sub sound source signals of by different speaker modules in the multiple speaker modules; and playing each of the multiple sub sound source signals by a corresponding speaker module in the multiple speaker modules according to the route.

As an improvement, the audio signal has at least one sound channel, and decomposing the audio signal to obtain multiple audio source signals of different categories includes:

decomposing the audio signal to obtain multiple sound source signals of different categories under the at least one sound channel.

As an improvement, establishing the route between all the multiple sub sound source signals and the multiple speaker modules according to the preset distribution principle includes:

obtaining a correlation between the multiple sub sound source signals of the same category under the at least one sound channel;

obtaining frequencies of all the multiple sub sound source signals;

establishing, referenced to the correlation and the frequencies, the route between all the multiple sub sound source signals and the multiple speaker modules according to the preset distribution principle. A second aspect of the embodiments of the present disclosure provides an on-board audio system, which includes a control and processing module arranged in a car cabin and multiple speaker modules connected to the control and processing module, where the multiple speaker modules are respectively located at different positions in the car cabin, and the control and processing module is configured to execute the audio playing method described in the first aspect of the embodiments of the present disclosure.

As an improvement, the control and processing module includes an operation processing module and a storage module, where the storage module is configured to store at least one program, and when the at least one program is executed by the operation processing module, cause the operation processing module to execute the audio playing method described in the first aspect of the embodiments of the present disclosure.

As an improvement, the control and processing module further includes an audio bus configured to transmit audio signals to be played to the operation processing module.

As an improvement, the control and processing module further includes a digital to analog conversion module configured to convert digital signals outputted by the operation processing module into analog signals.

As an improvement, the control and processing module further includes a power amplification module configured to power amplify the analog signals outputted by the digital to analog conversion module, to transmit to the multiple speaker modules.

As an improvement, the control and processing module further includes a power management module configured to perform power supply management for the operation processing module, the storage module, the digital to analog conversion module, the power amplification module, and the multiple speaker modules.

As an improvement, each of the multiple speaker modules includes one or more speakers.

As an improvement, each of the multiple speaker modules includes a subwoofer speaker module, a bass speaker module, and a tweeter speaker module.

A third aspect of the embodiment of the application provides a computer-readable storage medium on which an executable instruction is stored. When the executable instruction being executed, the audio playing method described in the first aspect of the embodiments of the application is executed.

It can be seen from the above description that, compared with the conventional art, the present disclosure has the following beneficial effects.

The audio signal to be played is obtained, the audio signal is decomposed to obtain multiple sound source signals of different categories (e.g., string playing sound signals), where each of the multiple sound source signal includes multiple sub sound source signals of the same category (e.g., string playing sound signals includes erhu sound signals, violin sound signals, cello sound signals, etc.). After that, the route between all sub sound source signals and multiple speaker modules is established according to the preset distribution principle, where the preset distribution principle indicates the rules that different sub sound source signals are played by different speaker modules. Finally, each of the multiple sub sound source signals is played by the corresponding speaker module according to the route. It can be seen that, in the present disclosure, the input audio signal is decomposed into multiple audio source signals of different categories according to the category of an audio source (each of the multiple audio source signals includes multiple sub audio source signals of the same category), and different sub audio source signals are played by the multiple speaker modules located at different positions in the car cabin with the reference to the preset distribution principle, thus providing more accurate, more immersive car multi-channel surround sound playback (i.e., playback refers to playing different sub sound source signals by different speaker modules), which can effectively improve the overall acoustic experience of the on-board audio system.

BRIEF DESCRIPTION OF THE DRAWINGS

For more clearly illustrating embodiments of the present disclosure or the technical solutions in the conventional technology, drawings referred to for describing the embodiments or the conventional technology will be briefly described hereinafter. Apparently, drawings in the following description are only examples of the present disclosure, and for the person skilled in the art, other drawings may be acquired based on the provided drawings without any creative efforts.

DETAILED DESCRIPTION

In order to make the purpose, technical solutions, and advantages of the present disclosure more obvious and understandable, the present disclosure will be described clearly and completely below in combination with the embodiments of the present disclosure and accompanying drawings, where the same or similar references throughout represent the same or similar elements or elements with the same or similar functions. It should be understood that the embodiments of the present disclosure described below are only used to explain the present disclosure and are not used to limit the present disclosure, that is, based on the embodiments of the present disclosure, all other embodiments obtained by ordinary technicians in the art without doing creative work shall fall within the scope of protection of the present disclosure. In addition, the technical features involved in each embodiment of the present disclosure described below can be combined as long as there is no conflict between them.

Figure 1:
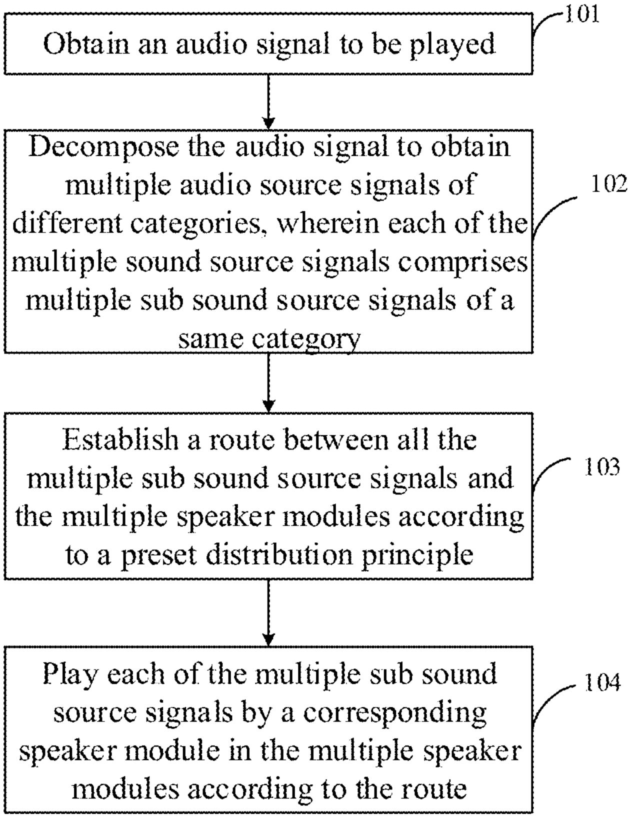
FIG. 1 is a schematic flow chart of an audio playing method provided according to an embodiment of the present disclosure.

Reference is made to FIG. 1, which is a schematic flow chart of an audio playing method provided according to an embodiment of the present disclosure. The audio playing method is applied to an on-board audio system including multiple speaker modules arranged at different positions in the car cabin. The audio playing method includes the following operations 101 to 104.

In operation 101, an audio signal to be played is obtained.

In the embodiments of the present disclosure, in response to playing audio through the on-board audio system, it is necessary to first obtain the audio signal to be played. The corresponding audio source of the obtained audio signal may be, but not limited to, a mono audio source, a dual audio source and a multi-channel audio source, and the obtained audio signal may come from the vehicle host or user terminals such as mobile phones and tablets.

In operation 102, the audio signal is decomposed to obtain multiple audio source signals of different categories.

In the embodiments of the present disclosure, after the audio signal to be played is obtained, it is also necessary to decompose the audio signal according to the type of audio source to obtain multiple audio source signals of different categories. Each of the multiple sound source signals includes multiple sub sound source signals of the same category. It should be noted that each of the multiple sound source signals may be single track signals or multi track sound source signals configured in advance in the corresponding sound source of the audio signal, including but not limited to left track signals, right track signals, center track signals, and surround track signals. Each of the multiple sound source signals may also be single track signals or multi track sound source signals separated and extracted from the audio signal in the operation 102, including but not limited to human voice source signals, instrument sound source signals, and background environment sound source signals.

In addition, each of the multiple audio signals may have either one channel or multiple channels. In response to each of the multiple audio signals having multiple channels, the decomposition result of operation 102 is to obtain multiple audio source signals of different categories under all channels. Assuming that the multiple audio signals are dual channels, the decomposition result of operation 102 is to obtain multiple audio source signals of different categories under a left channel, and multiple sound source signals of different categories under a right channel.

In operation 103, a route between all the multiple sub sound source signals and the multiple speaker modules is established according to a preset distribution principle.

In the embodiments of the present disclosure, after multiple sound source signals of different categories are separated and extracted from audio signals, it is also necessary to establish the route between all the multiple sub sound source signals and the multiple speaker modules according to the preset distribution principle. The preset distribution principle indicates rules for playing different sub sound source signals by different speaker modules.

Specifically, when operation 103 is executed, a correlation between the multiple sub sound source signals of the same category and frequencies of all the multiple sub sound source signals is obtained under the at least one channel, and the route between all the multiple sub sound source signals and the multiple speaker modules can be established according to the preset distribution principle with the obtained correlation and frequencies as reference, which will be described in detail in the examples given below.

In operation 104, each of the multiple sub sound source signals is played by a corresponding speaker module in the multiple speaker modules according to the route.

In the embodiments of the present disclosure, after the route between all the multiple sub sound source signals and the multiple speaker modules is established, it is also necessary to play each sub sound source signal by the corresponding speaker module according to the established route.

It can be seen from the above that in the embodiments of the present disclosure, the input audio signal is decomposed into multiple audio source signals of different categories according to the category of audio source (each audio source signal includes multiple sub audio source signals of the same category), and different sub audio source signals are played by the multiple speaker modules located at different positions in the car cabin with the reference to the preset distribution principle, thus providing more accurate and more immersive on-board multi-channel surround sound playback (i.e., playback refers to playing different sub sound source signals by different speaker modules), which can effectively improve the overall acoustic experience of the on-board audio system.

Figure 2:
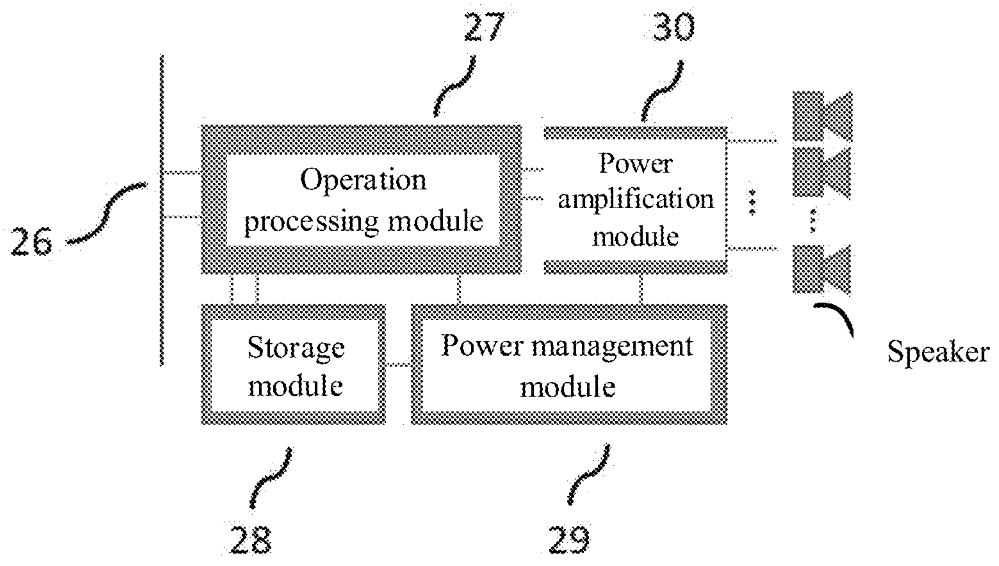
FIG. 2 is a module block diagram of an on-board audio system provided according to an embodiment of the present disclosure.

Reference is made to FIG. 2, which is a module block diagram of an on-board audio system provided according to an embodiment of the present disclosure.

As shown in FIG. 2, an on-board audio system is further provided according to the embodiments of the present disclosure, the on-board audio system includes a control and processing module arranged in the car cabin and multiple speaker modules connected to the control and processing module, where the multiple speaker modules are respectively located at different positions in the car cabin, and the control and processing module is configured to execute the audio playing method described in the embodiments of the present disclosure. In the embodiments of the present disclosure, the multiple speaker modules may have multiple types, such as a subwoofer speaker module, a subwoofer speaker module, a mid-high speaker module, and the like. Each of the multiple speaker modules includes one speaker or multiple speakers, which will be described below in the form of one speaker.

Specifically, the control and processing module includes an operation processing module 27, a storage module 28, an audio bus 26, a digital to analog conversion module (not shown in the figure), a power amplification module 30, and a power management module 29. The audio bus 26 is configured to transmit the audio signal to be played to the operation processing module 27. The storage module 28 is configured to store at least one program, and when the at least one program is executed by the operation processing module 27, cause the operation processing module 27 to execute the audio playing method according to the above embodiments. The digital analog conversion module is configured to convert digital signals outputted by the operation processing module 27 into analog signals. The power amplification module 30 is configured to power amplify the analog signals outputted by the digital to analog conversion module, to transmit to the multiple speaker modules. The power management module 29 is configured to perform power supply management for the operation processing module 27, the storage module 28, the digital to analog conversion module, the power amplification module 30, and the multiple speaker modules.

Specifically, the power amplifier module 30 has multiple input interfaces and multiple output interfaces, one input interface and one output interface form a transmission channel, and the number of transmission channels is the same as the number of speakers. The purpose of this design is to facilitate the transmission of each sub sound source signal after power amplification to the corresponding speakers for playing.

Figure 3:
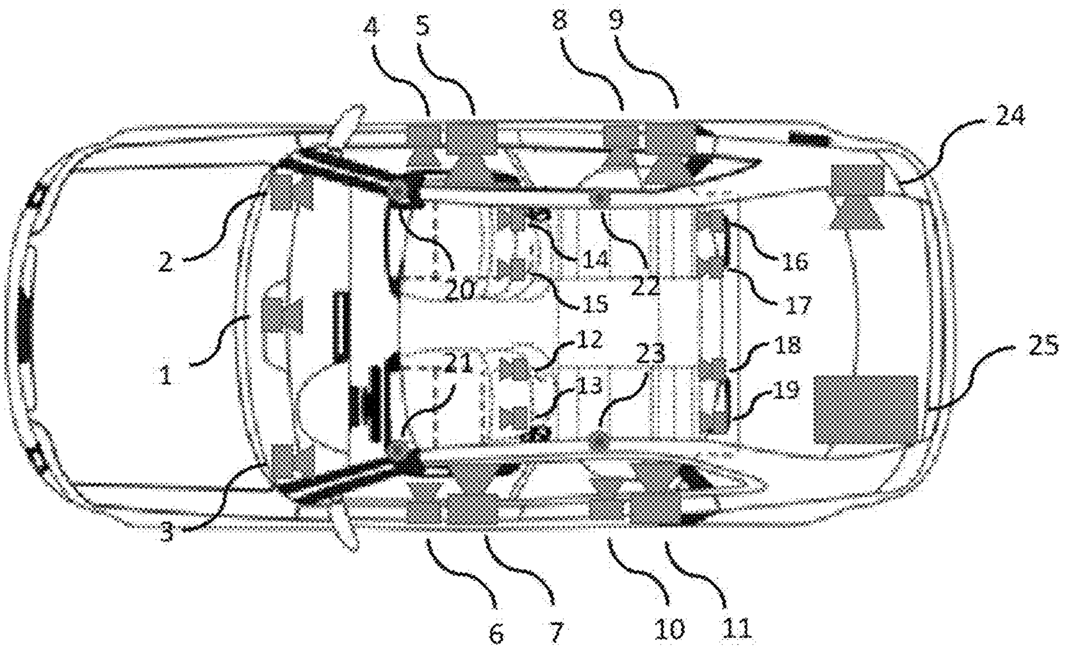
FIG. 3 is an example diagram of the on-board audio system provided by the embodiment of the present disclosure.

In order to better understand the on-board audio system and the audio playing method provided according to the embodiments of the present disclosure, the on-board audio system and the audio playing method provided according to the embodiments of the present disclosure will be described in detail with a 24-channel on-board audio system (i.e., 24 speakers are included) shown in FIG. 3 as an example.

Speaker 1 is located on a car center console, speaker 2 and speaker 3 are located on the left side and the right side of the car center console, respectively. Speakers 4 to speaker 11 are located on the right front door, left front door, right rear door, and left rear door of the car, speakers 12 to 19 are located on the headrest of the driver, co-driver, right rear seat, and left rear seat of the car, and speakers 20 to 23 are located on the right front, left front, right rear, and left rear of the car roof, speaker 24 is in the trunk of the car. Speakers 5, 9, 7 and 11 are bass speakers for reproducing sounds below 180 Hz, speaker 24 is a subwoofer for reproducing sounds below 60 Hz, and the remaining speakers are mid-high speakers for reproducing sounds above 180 Hz. The speakers 1 to 24 are connected to the control and processing module 25 by audio harness.

The control and processing module 25 is configured to obtain original audio signal (i.e., the audio signal to be played) by the audio bus 26. Taking the original audio signal as a dual channel, for example, the original audio signal can be represented as a left channel and a right channel respectively. By decomposing the audio content object (i.e., the source signal) of the original audio signal, the left channel L(t) and the right channel R(t) can be represented as follows:

$$L(t)=\sum_{a}^{A_L} L_a^1(t)+\sum_{b}^{B_L} L_b^2(t)+\sum_{c}^{C_L} L_c^3(t)+\dots$$

$$R(t)=\sum_{a}^{A_R} R_a^1(t)+\sum_{b}^{B_R} R_b^2(t)+\sum_{c}^{C_R} R_c^3(t)+\dots$$

Among them, $L_a^1$ (t), $L_b^2$(t), $L_c^3$(t), $R_a^1$(t), $R_b^2$(t), and $R_c^3$(t) represent audio content objects of different categories in the original audio source, and $A_L$, $B_L$, $C_L$, $A_R$, $B_R$, and $C_R$ represent the number of elements (i.e. sub sound source signals) contained in different audio content objects. In the embodiment of the present disclosure, the original audio signal is decomposed into six different audio content objects, including vocal, wind music (e.g., bamboo flute, brass pipe, etc.), plucked music (e.g., pipa, guitar, etc.), string music (e.g., erhu, violin, cello, etc.), drum percussion music (e.g., drum, bell, gong, etc.), background (e.g., wind, applause, rain, etc.), which can also be decomposed according to the product design requirements, which is not limited hereto. Take the sound of pipe music as an example, the corresponding sub sound source signal is the signal of bamboo flute, brass pipe, etc.

Then the original audio signal can be written as:

$$L(t)=\sum_{a}^{A_L} L_a^{Vocal}(t)+\sum_{b}^{B_L} L_b^{Wind}(t)+\sum_{c}^{C_L} L_c^{Plucked}(t)+\sum_{d}^{D_L} L_d^{Drums}(t)+\sum_{e}^{E_L} L_e^{String}(t)+\sum_{f}^{F_L} L_f^{Back}(t)$$

$$R(t)=\sum_{a}^{A_R} R_a^{Vocal}(t)+\sum_{b}^{B_R} R_b^{Wind}(t)+\sum_{c}^{C_R} R_c^{Plucked}(t)+\sum_{d}^{D_R} R_d^{Drums}(t)+\sum_{e}^{E_R} R_e^{String}(t)+\sum_{f}^{F_R} R_f^{Back}(t)$$

$L_a^{Vocal}$(t), $R_a^{Vocal}$(t) represent vocal content objects separated from the left and right sound channels of the original sound source, respectively; $L_a^{Wind}$(t), $R_a^{Wind}$(t) represent wind music content objects separated from the left and right sound channels of the original sound source, respectively; $L_c^{Plucked}$(t), $R_c^{Plucked}$(t) represent plucked music content objects separated from the left and right sound channels of the original sound source, respectively; $L_d^{Drums}$(t), $R_d^{Drums}$ (t) represent drum percussion music content objects separated from the left and right sound channels of the original sound source, respectively; $L_e^{String}$(t), $R_e^{String}$(t) represent string music content objects separated from the left and right sound channels of the original sound source, respectively; $L_f^{Back}$(t), $R_f^{Back}$ (t) represent background sound content objects separated from the left and right sound channels of the original sound source, respectively.

After the audio content object content of the original audio source is decomposed, it is necessary to analyze the content of each audio content object. According to certain distribution principle, different audio content objects are routed to the input terminals of different power amplification modules. This part of the processing is completed in the operation processing module 27. The distribution principle, on the one hand, should basically follow the basic characteristics of the human ear's subjective perception of spatial audio in multiple directions and angles, to avoid violating the human ear's hearing common sense and causing bad hearing, on the other hand, it needs to make a certain degree of adaptation and optimization according to the design requirements of the product definition.

For the audio content objects decomposed from the original sound source, the audio content object with high correlation among the same kind of elements in the original left and right channel sound source is analyzed, for example, the correlation $rsq_{vocal}$ of the vocal content object in the left and right channels of the original sound source is calculated as:

$$rsq_{vocal}=RSQ[L_a^{Vocal}(t),R_a^{Vocal}(t)],$$

RSQ [ ] represents a square value of Pearson product moment correlation coefficient between two variables. In response to rsq being greater than or equal to 0.8, it can be considered that there is a high correlation between the two variables; In response to rsq being smaller than 0.8, it can be considered that there is a low correlation between the two variables. Thus, the audio content object of the left channel source of the original audio signal can be decomposed into the following form:

$$L(t)=L^{rsq\geq 0.8}(t)+L^{rsq<0.8}(t),$$

$L^{rsq\geq 0.8}$(t) represents a part with high correlation with the right channel in the left channel audio signal, and $L^{rsq<0.8}$(t) represents a part with low correlation with the right channel in the left channel audio, which can be respectively written as:

$$L^{rsq\geq 0.8}(t)=\sum_{a}^{A_L} L_a^{Vocal}(t,rsq_{vocal})|_{rsq_{vocal}\geq 0.8}+\sum_{b}^{B_L} L_b^{Wind}(t,rsq_{wind})|_{rsq_{wind}\geq 0.8}+\sum_{c}^{C_L} L_c^{Plucked}(t,rsq_{plucked})|_{rsq_{plucked}\geq 0.8}+\sum_{d}^{D_L} L_d^{Drums}(t,rsq_{drums})|_{rsq_{drums}\geq 0.8}+\sum_{e}^{E_L} L_e^{String}(t,rsq_{string})|_{rsq_{string}\geq 0.8}+\sum_{f}^{F_L} L_f^{Back}(t,rsq_{back})|_{rsq_{back}\geq 0.8}$$

$$L^{rsq<0.8}(t)=\sum_{a}^{A_L} L_a^{Vocal}(t,rsq_{vocal})|_{rsq_{vocal}<0.8}+\sum_{b}^{B_L} L_b^{Wind}(t,rsq_{wind})|_{rsq_{wind}<0.8}+\sum_{c}^{C_L} L_c^{Plucked}(t,rsq_{plucked})|_{rsq_{plucked}<0.8}+\sum_{d}^{D_L} L_d^{Drums}(t,rsq_{drums})|_{rsq_{drums}<0.8}+\sum_{e}^{E_L} L_e^{String}(t,rsq_{string})|_{rsq_{string}<0.8}+\sum_{f}^{F_L} L_f^{Back}(t,rsq_{back})|_{rsq_{back}<0.8}$$

Similarly, the audio content object of the left channel source of the original audio signal can be decomposed into the following form:

$$R(t)=R^{rsq\geq 0.8}(t)+R^{rsq<0.8}(t)$$

$$R^{rsq\geq 0.8}(t)=\sum_{a}^{A_R} R_a^{Vocal}(t,rsq_{vocal})|_{rsq_{vocal}\geq 0.8}+\sum_{b}^{B_R} R_b^{Wind}(t,rsq_{wind})|_{rsq_{wind}\geq 0.8}+$$

-continued $$\sum_{c}^{C_R} R_c^{Plucked}(t, rsq_{plucked})|_{rsq_{plucked}\geq 0.8} + \sum_{d}^{D_R} R_d^{Drums}(t, rsq_{drums})|_{rsq_{drums}\geq 0.8} + \sum_{e}^{E_R} R_e^{String}(t, rsq_{string})|_{rsq_{string}\geq 0.8} + \sum_{f}^{F_R} R_f^{Back}(t, rsq_{back})|_{rsq_{back}\geq 0.8}$$

$$R^{rsq<0.8}(t) = \sum_{a}^{A_R} R_a^{Vocal}(t, rsq_{vocal})|_{rsq_{vocal}<0.8} + \sum_{b}^{B_R} R_b^{Wind}(t, rsq_{wind})|_{rsq_{wind}<0.8} + \sum_{c}^{C_R} R_c^{Plucked}(t, rsq_{plucked})|_{rsq_{plucked}<0.8} + \sum_{d}^{D_R} R_d^{Drums}(t, rsq_{drums})|_{rsq_{drums}<0.8} + \sum_{e}^{E_R} R_e^{String}(t, rsq_{string})|_{rsq_{string}<0.8} + \sum_{f}^{F_R} R_f^{Back}(t, rsq_{back})|_{rsq_{back}<0.8}$$

For the audio content objects decomposed from the original sound source, after the audio content objects with high correlation among similar elements in the original left and right channel sound sources are analyzed, frequency components of the audio content objects should also be considered to adapt to different bass speakers, mid-range speakers and tweeters. For example, the drug percussion category objects of the left channel sound source include drum, ring, gong, and other sound content elements, it is obvious that the frequency of drum sound is low, while the frequency of ringing is high. These two kinds of sound content objects should be respectively blasted to the bass speaker and the mid high speaker for playback.

The frequency component analysis of the audio content objects can be as follows, for example, the frequency component analysis is performed on a part of the drum percussion category objects in the left sound channel with a high correlation between the left sound channel and the right sound channel $L_d^{Drums}(t, rsq_{drums})|_{rsq_{drums}\geq 0.8}$ as following:

$$(f_{drums}, amp_{drums}) = FFT[L_d^{Drums}(t, rsq_{drums})|_{rsq_{drums}\geq 0.8}],$$

Among them, FFT [ ] is a fast Fourier transform, which is a basic digital signal processing method for converting time-domain signals to frequency-domain signals. $f_{drums}$ represents the frequency component after transformation, and $amp_{drums}$ represents the amplitude after transformation.

In the embodiments of the present disclosure, all audio content objects are divided into three frequency ranges for processing, namely <60 Hz, 60 Hz to 180 Hz, and >180 Hz. It should be noted that the audio content object is divided into several frequency domain ranges for processing, and can also be designed and changed according to on-board speaker architecture. For example, in response to the on-board speaker architecture contains separate channels to drive tweeters with a working frequency band above 2000 Hz, the audio content object should also be divided into a part smaller than 2000 Hz and a part larger than 2000 Hz. $L_d^{Drums}(t)$ can be written as:

$$L_d^{Drums}(t) = L_d^{Drums}(t, f_{drums})|_{rsq_{drums}\geq 0.8}^{f_{drums}<60Hz} + L_d^{Drums}(t, f_{drums}, rsq_{drums})|_{rsq_{drums}\geq 0.8}^{f_{drums}\in[60Hz, 180Hz]} + L_d^{Drums}(t, f_{drums}, rsq_{drums})|_{rsq_{drums}\geq 0.8}^{f_{drums}>180Hz},$$

After the content analysis of the audio content objects is completed, the operation processing module 27 is configured to distribute different audio content objects to the input terminals of different power amplification modules 30.

Input terminal of the power amplifier module 30 corresponding to speaker 1:

$$\sum_{a}^{A_L} L_a^{Vocal}(t, f_{vocal}, rsq_{vocal})|_{rsq_{vocal}\geq 0.8}^{f_{vocal}>180\text{ Hz}} + \sum_{a}^{A_R} R_a^{Vocal}(t, f_{vocal}, rsq_{vocal})|_{rsq_{vocal}\geq 0.8}^{f_{vocal}>180\text{ Hz}} + \sum_{b}^{B_L} L_b^{Wind}(t, f_{wind}, rsq_{wind})|_{rsq_{wind}\geq 0.8}^{f_{wind}>180\text{ Hz}} + \sum_{b}^{B_R} R_b^{Wind}(t, f_{wind}, rsq_{wind})|_{rsq_{wind}\geq 0.8}^{f_{wind}>180\text{ Hz}} + \sum_{d}^{D_R} R_d^{Drums}(t, f_{drums}, rsq_{drums})|_{rsq_{drums}\geq 0.8}^{f_{drums}>180\text{ Hz}} + \sum_{d}^{D_L} L_d^{Drums}(t, f_{drums}, rsq_{drums})|_{rsq_{drums}\geq 0.8}^{f_{drums}>180\text{ Hz}}$$

Input terminal of the power amplifier module 30 corresponding to speaker 2:

$$\sum_{a}^{A_R} L_a^{Vocal}(t, f_{vocal}, rsq_{vocal})|_{rsq_{vocal}\geq 0.8}^{f_{vocal}>180\text{ Hz}} + \sum_{a}^{A_R} R_a^{Vocal}(t, f_{vocal}, rsq_{vocal})|_{rsq_{vocal}\geq 0.8}^{f_{vocal}>180\text{ Hz}} + \sum_{b}^{B_R} R_b^{Wind}(t, f_{wind}, rsq_{wind})|_{rsq_{wind}\geq 0.8}^{f_{wind}>180\text{ Hz}} + \sum_{c}^{C_R} R_c^{Plucked}(t, f_{plucked}, rsq_{plucked})|_{rsq_{plucked}\geq 0.8}^{f_{plucked}>180\text{ Hz}} + \sum_{d}^{D_R} R_d^{Drums}(t, f_{drums}, rsq_{drums})|_{rsq_{drums}\geq 0.8}^{f_{drums}>180\text{ Hz}} + \sum_{e}^{E_R} R_e^{String}(t, f_{string}, rsq_{string})|_{rsq_{drums}\geq 0.8}^{f_{string}>180\text{ Hz}} + \sum_{f}^{F_R} R_f^{Back}(t, f_{back}, rsq_{back})|_{rsq_{drums}\geq 0.8}^{f_{back}>180\text{ Hz}}$$

Input terminal of the power amplifier module 30 corresponding to speaker 3:

$$\sum_{a}^{A_L} L_a^{Vocal}(t, f_{vocal}, rsq_{vocal})|_{rsq_{vocal}<0.8}^{f_{vocal}>180\text{ Hz}} + \sum_{a}^{A_L} L_a^{Vocal}(t, f_{vocal}, rsq_{vocal})|_{rsq_{vocal}\geq 0.8}^{f_{vocal}>180\text{ Hz}} + \sum_{b}^{B_L} L_b^{Wind}(t, f_{wind}, rsq_{wind})|_{rsq_{wind}\geq 0.8}^{f_{wind}>180\text{ Hz}} +$$

-continued $$\sum_{c}^{C_L} L_c^{Plucked}(t, f_{plucked}, rsq_{plucked})|_{rsq_{plucked} \geq 0.8}^{f_{plucked} > 180\ Hz} +$$

$$\sum_{d}^{D_L} L_d^{Drums}(t, f_{drums}, rsq_{drums})|_{rsq_{drums} \geq 0.8}^{f_{drums} > 180\ Hz} +$$

$$\sum_{e}^{E_L} L_e^{String}(t, f_{string}, rsq_{string})|_{rsq_{drums} \geq 0.8}^{f_{string} > 180\ Hz} +$$

$$\sum_{f}^{F_L} L_f^{Back}(t, f_{back}, rsq_{back})|_{rsq_{drums} \geq 0.8}^{f_{back} > 180\ Hz}$$

Input terminal of the power amplifier module 30 corresponding to speaker 4:

$$\sum_{b}^{B_R} R_b^{Wind}(t, f_{wind}, rsq_{wind})|_{rsq_{wind} < 0.8}^{f_{wind} > 180\ Hz} +$$

$$\sum_{c}^{C_R} R_c^{Plucked}(t, f_{plucked}, rsq_{plucked})|_{rsq_{plucked} < 0.8}^{f_{plucked} > 180\ Hz} +$$

$$\sum_{c}^{C_R} R_c^{Plucked}(t, f_{plucked}, rsq_{plucked})|_{rsq_{plucked} < 0.8}^{f_{plucked} > 180\ Hz} +$$

$$\sum_{e}^{E_R} R_e^{String}(t, f_{string}, rsq_{string})|_{rsq_{drums} \geq 0.8}^{f_{string} > 180\ Hz} +$$

$$\sum_{f}^{F_L} L_f^{Back}(t, f_{back}, rsq_{back})|_{rsq_{drums} \geq 0.8}^{f_{back} > 180\ Hz}$$

Input terminal of the power amplifier module 30 corresponding to speaker 5:

$R(t,f)|^{f \in [60Hz, 180Hz]}$ $R(t,f)|^{f \in [60Hz, 180Hz]}$ represents all audio content objects with frequency components between 60 Hz and 180 Hz in the original right channel sound source.

Input terminal of the power amplifier module 30 corresponding to speaker 6:

$$\sum_{b}^{B_L} L_b^{Wind}(t, f_{wind}, rsq_{wind})\Big|_{rsq_{wind} < 0.8}^{f_{wind} > 180\ Hz}$$

$$+\sum_{c}^{C_L} L_c^{Plucked}(t, f_{plucked}, rsq_{plucked})\Big|_{rsq_{plucked} < 0.8}^{f_{plucked} > 180\ Hz}$$

$$+\sum_{c}^{C_L} L_c^{Plucked}(t, f_{plucked}, rsq_{plucked})\Big|_{rsq_{plucked} < 0.8}^{f_{plucked} > 180\ Hz}$$

$$+\sum_{e}^{E_L} L_e^{String}(t, f_{string}, rsq_{string})\Big|_{rsq_{drums} < 0.8}^{f_{string} > 180\ Hz}$$

$$+\sum_{f}^{F_L} L_f^{Back}(t, f_{back}, rsq_{back})\Big|_{rsq_{drums} < 0.8}^{f_{back} > 180\ Hz}$$

Input terminal of the power amplifier module 30 corresponding to speaker 7:

$L(t,f)|^{f \in [60Hz, 180Hz]}$ $L(t,f)|^{f \in [60Hz, 180Hz]}$ represents all audio content objects with frequency components between 60 Hz and 180 Hz in the original left channel sound source.

Input terminal of the power amplifier module 30 corresponding to speaker 8:

$$\sum_{a}^{A_R} R_a^{Vocal}(t, f_{vocal}, rsq_{vocal})\Big|_{rsq_{vocal} < 0.8}^{f_{vocal} > 180\ Hz}$$

$$+\sum_{b}^{B_R} R_b^{Wind}(t, f_{wind}, rsq_{wind})\Big|_{rsq_{wind} < 0.8}^{f_{wind} > 180\ Hz}$$

$$+\sum_{c}^{C_R} R_c^{Plucked}(t, f_{plucked}, rsq_{plucked})\Big|_{rsq_{plucked} < 0.8}^{f_{plucked} > 180\ Hz}$$

$$+\sum_{c}^{C_R} R_c^{Plucked}(t, f_{plucked}, rsq_{plucked})\Big|_{rsq_{plucked} < 0.8}^{f_{plucked} > 180\ Hz}$$

$$+\sum_{e}^{E_R} R_e^{String}(t, f_{string}, rsq_{string})\Big|_{rsq_{drums} < 0.8}^{f_{string} > 180\ Hz}$$

$$+\sum_{f}^{F_R} R_f^{Back}(t, f_{back}, rsq_{back})\Big|_{rsq_{drums} < 0.8}^{f_{back} > 180\ Hz}$$

Input terminal of the power amplifier module 30 corresponding to speaker 9:

$R(t,f)|^{f \in [60Hz, 180Hz]}$, $R(t,f)|^{f \in [60Hz, 180Hz]}$, represents all audio content objects with frequency components between 60 Hz and 180 Hz in the original right channel sound source.

Input terminal of the power amplifier module 30 corresponding to speaker 10:

$$\sum_{a}^{A_L} L_a^{Vocal}(t, f_{vocal}, rsq_{vocal})\Big|_{rsq_{vocal} < 0.8}^{f_{vocal} > 180\ Hz}$$

$$+\sum_{b}^{B_L} L_b^{Wind}(t, f_{wind}, rsq_{wind})\Big|_{rsq_{wind} < 0.8}^{f_{wind} > 180\ Hz}$$

$$+\sum_{c}^{C_R} L_c^{Plucked}(t, f_{plucked}, rsq_{plucked})\Big|_{rsq_{plucked} < 0.8}^{f_{plucked} > 180\ Hz}$$

$$+\sum_{c}^{C_R} L_c^{Plucked}(t, f_{plucked}, rsq_{plucked})\Big|_{rsq_{plucked} < 0.8}^{f_{plucked} > 180\ Hz}$$

$$+\sum_{e}^{E_R} L_e^{String}(t, f_{string}, rsq_{string})\Big|_{rsq_{drums} < 0.8}^{f_{string} > 180\ Hz}$$

$$+\sum_{f}^{F_R} L_f^{Back}(t, f_{back}, rsq_{back})\Big|_{rsq_{drums} < 0.8}^{f_{back} > 180\ Hz}$$

Input terminal of the power amplifier module 30 corresponding to speaker 11:

$L(t,f)|^{f\in[60Hz,180Hz]}$.

$L(t,f)|^{f\in[60Hz,180Hz]}$. represents all audio content objects with frequency components between 60 Hz and 180 Hz in the original left channel sound source.

Input terminal of the power amplifier module 30 corresponding to speaker 12:

$$\sum_{c}^{C_R} R_c^{Plucked}(t, f_{plucked}, rsq_{plucked})\Big|_{rsq_{plucked}<0.8}^{f_{plucked}>180\,Hz} + \sum_{e}^{E_R} R_e^{String}(t, f_{string}, rsq_{string})\Big|_{rsq_{drums}<0.8}^{f_{string}>180\,Hz}$$

Input terminal of the power amplifier module 30 corresponding to speaker 13:

$$\sum_{c}^{C_L} L_c^{Plucked}(t, f_{plucked}, rsq_{plucked})\Big|_{rsq_{plucked}<0.8}^{f_{plucked}>180\,Hz} + \sum_{e}^{E_L} L_e^{String}(t, f_{string}, rsq_{string})\Big|_{rsq_{drums}<0.8}^{f_{string}>180\,Hz}$$

Input terminal of the power amplifier module 30 corresponding to speaker 14:

$$\sum_{c}^{C_R} R_c^{Plucked}(t, f_{plucked}, rsq_{plucked})\Big|_{rsq_{plucked}<0.8}^{f_{plucked}>180\,Hz} + \sum_{e}^{E_R} R_e^{String}(t, f_{string}, rsq_{string})\Big|_{rsq_{drums}<0.8}^{f_{string}>180\,Hz}$$

Input terminal of the power amplifier module 30 corresponding to speaker 15:

$$\sum_{c}^{C_L} L_c^{Plucked}(t, f_{plucked}, rsq_{plucked})\Big|_{rsq_{plucked}<0.8}^{f_{plucked}>180\,Hz} + \sum_{e}^{E_L} L_e^{String}(t, f_{string}, rsq_{string})\Big|_{rsq_{drums}<0.8}^{f_{string}>180\,Hz}$$

Input terminal of the power amplifier module 30 corresponding to speaker 16:

$$\sum_{c}^{C_R} R_c^{Plucked}(t, f_{plucked}, rsq_{plucked})\Big|_{rsq_{plucked}<0.8}^{f_{plucked}>180\,Hz} + \sum_{e}^{E_R} R_e^{String}(t, f_{string}, rsq_{string})\Big|_{rsq_{drums}<0.8}^{f_{string}>180\,Hz}$$

Input terminal of the power amplifier module 30 corresponding to speaker 17:

$$\sum_{c}^{C_L} L_c^{Plucked}(t, f_{plucked}, rsq_{plucked})\Big|_{rsq_{plucked}<0.8}^{f_{plucked}>180\,Hz} + \sum_{e}^{E_L} L_e^{String}(t, f_{string}, rsq_{string})\Big|_{rsq_{drums}<0.8}^{f_{string}>180\,Hz}$$

Input terminal of the power amplifier module 30 corresponding to speaker 18:

$$\sum_{c}^{C_R} R_c^{Plucked}(t, f_{plucked}, rsq_{plucked})\Big|_{rsq_{plucked}<0.8}^{f_{plucked}>180\,Hz} + \sum_{e}^{E_R} R_e^{String}(t, f_{string}, rsq_{string})\Big|_{rsq_{drums}<0.8}^{f_{string}>180\,Hz}$$

Input terminal of the power amplifier module 30 corresponding to speaker 19:

$$\sum_{c}^{C_L} L_c^{Plucked}(t, f_{plucked}, rsq_{plucked})\Big|_{rsq_{plucked}<0.8}^{f_{plucked}>180\,Hz} + \sum_{e}^{E_L} L_e^{String}(t, f_{string}, rsq_{string})\Big|_{rsq_{drums}<0.8}^{f_{string}>180\,Hz}$$

Input terminal of the power amplifier module 30 corresponding to speaker 20:

$$\sum_{f}^{F_R} R_f^{Back}(t, f_{back}, rsq_{back})\Big|_{rsq_{drums}<0.8}^{f_{back}>180\,Hz}$$

Input terminal of the power amplifier module 30 corresponding to speaker 21:

$$\sum_{f}^{F_L} L_f^{Back}(t, f_{back}, rsq_{back})\Big|_{rsq_{drums}<0.8}^{f_{back}>180\,Hz}$$

Input terminal of the power amplifier module 30 corresponding to speaker 22:

$$\sum_{f}^{F_R} R_f^{Back}(t, f_{back}, rsq_{back})\Big|_{rsq_{drums}<0.8}^{f_{back}>180\,Hz}$$

Input terminal of the power amplifier module 30 corresponding to speaker 23:

$$\sum_{f}^{F_L} L_f^{Back}(t, f_{back}, rsq_{back})\Big|_{rsq_{drums}<0.8}^{f_{back}>180\,Hz}$$

Input terminal of the power amplifier module 30 corresponding to speaker 24:

$L(t,f)|^{f<60Hz}+R(t,f)|^{f<60Hz}$, $L(t,f)|^{f<60Hz}+R(t,f)|^{f<60Hz}$, represent all audio content objects with frequency components below 60 Hz in sound sources of the original left sound channel and the right sound channel, respectively.

After the audio content objects are routed, the operation processing module 27 is further configured to perform some other digital signal processing, including but not limited to delay adjustment, gain adjustment, phase adjustment, equalization adjustment, etc. After the processing is completed, digital to analog conversion and power amplification are carried out, and signals are transmitted to the corresponding speaker channel for playback, which is carried out in the power amplification module 30.

Figure 4:
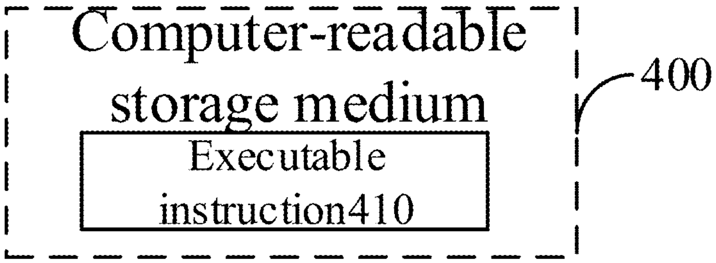
FIG. 4 is a module block diagram of a computer-readable storage medium provided according to an embodiment of the present disclosure.

Reference is made to FIG. 4, which is a module block diagram of a computer-readable storage medium provided according to an embodiment of the present disclosure.

As shown in FIG. 4, a computer-readable storage medium 400 is further provided according to the embodiments of the present disclosure, on which an executable instruction 410 is stored. When the executable instruction 410 is executed, the audio playing method provided according to the embodiments of the present disclosure is executed.

The operations of the method or algorithm described in conjunction with the embodiments disclosed herein can be directly implemented with hardware, software modules executed by processors, or a combination of the two. The software modules can be placed in random access memory (RAM), memory, read-only memory (ROM), electrically programmable ROM, electrically erasable programmable ROM, register, hard disk, removable disk, CD-ROM, or any other form of storage medium known in the technical field.

In the above embodiments, the operations of the method or algorithm described in conjunction with the embodiments can be realized wholly or partially by software, hardware, firm ware, or any combination thereof. In response to the operations being implemented by software, it can be implemented in the form of a computer program product in whole or in part. The computer program product includes one or more computer instructions. In response to the computer program instructions being loaded and executed on a computer, the processes or functions described in the present disclosure are generated in whole or in part. The computer may be a general-purpose computer, a special purpose computer, a computer network, or other programmable device. The computer instructions can be stored in a computer-readable storage medium, or transmitted from one computer-readable storage medium to another computer-readable storage medium. For example, the computer instructions may be transmitted from a website site, computer, server or data center to another website site, computer Server or data center. The computer-readable storage medium may be any available medium that can be accessed by a computer or a data storage device including a server, a data center, etc. integrated with one or more available media. The available media may be magnetic media (e.g., floppy disk, hard disk, tape), optical media (e.g., DVD), or semiconductor media (e.g., solid state disk).

It should be noted that the embodiments in the description are described in a progressive manner. Each of the embodiments mainly focuses on its differences from other embodiments, and reference may be made among these embodiments with respect to the same or similar parts. For product embodiments, since they are similar to those method embodiments, the description is simple, and reference may be to the description of the method embodiments with respect to related contents.

It should also be noted that in the content of the present disclosure, relational terms such as first and second are only used to distinguish one entity or operation from another entity or operation, and do not necessarily require or imply that there is any such actual relationship or order between these entities or operations. Moreover, terms such as "including", "containing" or any other variations thereof are intended to cover non-exclusive inclusion, so that a process, a method, an article, or a device including a series of elements not only includes those elements, but also includes other elements that are not explicitly listed, or elements inherent to the process, the method, the article, or the device. If there are no more restrictions, an element preceding by the statement "including a . . . " does not exclude the existence of other same elements in the process, the method, the article, or the device that includes the element.

The above illustration of the disclosed embodiments can enable those skilled in the art to implement or use the present application. Various modifications to the embodiments are apparent to the person skilled in the art, and the general principle herein can be implemented in other embodiments without departing from the spirit or scope of the present application. Therefore, the present application is not limited to the embodiments described herein, but should be in accordance with the broadest scope consistent with the principle and novel features disclosed herein.

What is claimed is:

1. An audio playing method, applied to an on-board audio system, wherein the on-board audio system comprises a plurality of speaker modules arranged at different positions in a car cabin;

the audio playing method comprises:

obtaining an audio signal to be played;

decomposing the audio signal to obtain a plurality of audio source signals of different categories, wherein each of the plurality of sound source signals comprises a plurality of sub sound source signals of a same category;

establishing a route between all the plurality of sub sound source signals and the plurality of speaker modules according to a preset distribution principle, wherein the preset distribution principle indicates rules for playing different sub sound source signals in the plurality of sub sound source signals by different speaker modules in the plurality of speaker modules;

playing each of the plurality of sub sound source signals by a corresponding speaker module in the plurality of speaker modules according to the route.

2. The audio playing method according to claim 1, wherein the audio signal has at least one sound channel, and decomposing the audio signal to obtain a plurality of audio source signals of different categories comprises:

decomposing the audio signal to obtain a plurality of sound source signals of different categories under the at least one sound channel.

3. The audio playing method according to claim 2, wherein establishing the route between all the plurality of sub sound source signals and the plurality of speaker modules according to the preset distribution principle comprises:

obtaining a correlation between the plurality of sub sound source signals of the same category under the at least one sound channel;

obtaining frequencies of all the plurality of sub sound source signals;

establishing, referenced to the correlation and the frequencies, the route between all the plurality of sub sound source signals and the plurality of speaker modules according to the preset distribution principle.

4. An on-board audio system, comprising a control and processing module arranged in a car cabin and a plurality of speaker modules connected to the control and processing module, wherein the plurality of speaker modules are respectively located at different positions in the car cabin, and the control and processing module is configured to execute the audio playing method according to claim 1.

5. The on-board audio system according to claim 4, wherein the control and processing module is configured to execute the audio playing method according to claim 2.

6. The on-board audio system according to claim 4, wherein the control and processing module is configured to execute the audio playing method according to claim 3.

7. The on-board audio system according to claim 4, wherein the control and processing module comprises an operation processing module and a storage module, wherein the storage module is configured to store at least one program, and when the at least one program is executed by the operation processing module, cause the operation processing module to execute the audio playing method according to claim 1.

8. The on-board audio system according to claim 7, wherein the storage module is configured to store at least one program, and when the at least one program is executed by the operation processing module, cause the operation processing module to execute the audio playing method according to claim 2.

9. The on-board audio system according to claim 7, wherein the storage module is configured to store at least one program, and when the at least one program is executed by the operation processing module, cause the operation processing module to execute the audio playing method according to claim 3.

10. The on-board audio system according to claim 7, wherein the control and processing module further comprises an audio bus configured to transmit audio signals to be played to the operation processing module.

11. The on-board audio system according to claim 7, wherein the control and processing module further comprises a digital to analog conversion module configured to convert digital signals outputted by the operation processing module into analog signals.

12. The on-board audio system according to claim 11, wherein the control and processing module further comprises a power amplification module configured to power amplify the analog signals outputted by the digital to analog conversion module, to transmit to the plurality of speaker modules.

13. The on-board audio system according to claim 12, wherein the control and processing module further comprises a power management module configured to perform power supply management for the operation processing module, the storage module, the digital to analog conversion module, the power amplification module, and the plurality of speaker modules.

14. The on-board audio system according to claim 4, wherein each of the plurality of speaker modules comprises one or more speakers.

15. The on-board audio system according to claim 4, wherein each of the plurality of speaker modules comprises a subwoofer speaker module, a bass speaker module, and a tweeter speaker module.

16. A non-transitory computer-readable storage medium, wherein the non-transitory computer-readable storage medium is stored with executable instructions, and when the executable instructions being executed, cause the audio playing method according to claim 1 to be executed.

17. The non-transitory computer-readable storage medium according to claim 16, wherein the non-transitory computer-readable storage medium is stored with executable instructions, and when the executable instructions being executed, cause the audio playing method according to claim 2 to be executed.

18. The non-transitory computer-readable storage medium according to claim 16, wherein the non-transitory computer-readable storage medium is stored with executable instructions, and when the executable instructions being executed, cause the audio playing method according to claim 3 to be executed.

* * * * *